Figure 1:
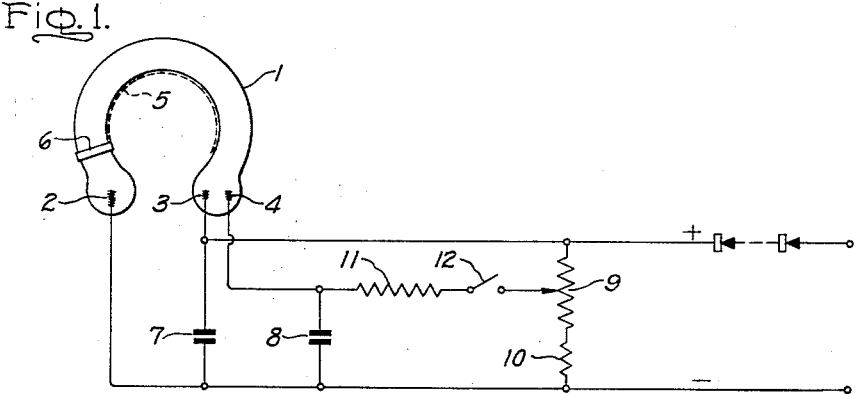

Jan. 19, 1960  HANS-FRIEDRICH BORCHERS ET AL  2,922,079
APPARATUS FOR PRODUCING FLASH ILLUMINATION
Filed June 17, 1958

Inventors:
Hans-Friedrich Borchers,
Joseph Marterstock,
by Andrew J. Bootz
Their Attorney.

2,922,079
Patented Jan. 19, 1960

2,922,079

APPARATUS FOR PRODUCING FLASH ILLUMINATION

Hans-Friedrich Borchers, Berlin-Spandau, and Joseph Marterstock, Berlin-Schoneberg, Germany, assignors to Patent-Treuhand-Gesellschaft für elektrische Glühlampen m.b.H., a German company Application June 17, 1958, Serial No. 742,628

Claims priority, application Germany June 26, 1957

2 Claims. (Cl. 315—234)

This invention relates generally to an electronic flash device for obtaining a flash of high intensity for purposes of illumination such as is useful for photographic illumination, and more specifically is directed to apparatus utilizing the sudden discharge of electrical energy through a gaseous discharge tube for photographic purposes.

In such an electronic flash device, it is desirable to provide for regulation of the intensity of the illumination generated in order that, for example, a better calculation of the guide number for photographic use can be made. Different methods are known for varying the flash intensity in single-anode gaseous discharge tubes, e.g., by different series or parallel arrangements of storage condensers or by variation of the charging voltage on the condensers. Some disadvantages in these arrangements are the limited number of light intensities available and the considerable load placed on the change-over switch. It is also well known to provide a double electrode discharge flash lamp with an energizing electrode which is used as an auxiliary starting means for the main discharge by means of a preliminary ionizing of the gas of the discharge path. A constant auxiliary voltage is imposed on this second anode; its charging condenser has a relatively small capacitance. The main anode for the flash discharge is connected with a condenser of greater capacitance to which different charging voltages may be applied for producing different light output intensities.

It is therefore an object of this invention to provide an electronic flash device in which the intensity of the flash discharge is readily and conveniently regulated.

According to the present invention an electronic flash device of variable flash intensity consists of a gaseous discharge tube fed by condensers and provided with several electrodes, for example, a cathode, a starting electrode, and two anodes. The variable flash intensity is obtained by regulating the energy introduced to the main discharge through each anode, as, e.g., by taking energy out of the main discharge or feeding energy into the main discharge across one or several of the anodes.

One (or more) of the anodes, hereinafter referred to as the main anode, is, therefore, connected (individually or commonly) with a condenser, hereinafter referred to as the main condenser, which is charged to a constant voltage; one (or more) of the anodes, hereinafter referred to as a secondary anode, is connected (individually or commonly) with a condenser, hereinafter referred to as the secondary condenser, of variable charging voltage. Depending upon the potentials of the secondary condenser, energy is taken off or supplied to the main flash discharge across the anode connected with it; thus, for instance, with a small charging voltage of the secondary condenser, energy is taken from the discharge in such a manner that this condenser is charged to a higher potential.

The secondary condensers may be of greater, similar, or less capacity than the main condensers. The proportion of capacity between the secondary condensers and the main condensers has an influence upon the regulation characteristics. The greater the capacity of the secondary condensers, the more energy is supplied to the discharge with high charging voltage or removed from it with low charging voltage; that is, the range of regulation is extended and the regulation sensitivity is increased. On the other hand, if the capacity of the secondary condensers is less, the range of regulation is reduced and the regulation sensitivity is decreased.

The continuous or variable charging voltage of the secondary condenser may be applied in any desired steps, for example, by an adjustable voltage divider or potentiometer or, where the secondary condensers are of the electrolytic type, utilization of the leakage current will produce variable voltages across the condensers when they are connected across variable series resistances. It would also be possible to control or vary the stored energy of the secondary condenser by varying the capacity of said condenser and by connecting it with a source of permanently adjusted voltage, as, for example, by connecting across a voltage divider. It is also possible to influence the discharge if controllable connecting elements are provided for in the leads of the secondary condensers by which the time constant of the discharge of the secondary condenser may be varied.

Figure 2:
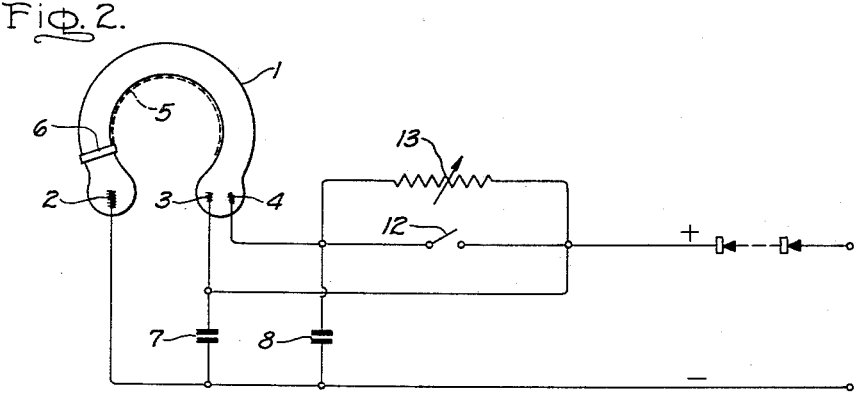

The invention will best be understood when considered with the following detailed description and the accompanying drawings, in which:

Fig. 1 diagrammatically illustrates one embodiment of the invention,

Fig. 2 diagrammatically illustrates another embodiment of the invention, and

Figure 3:
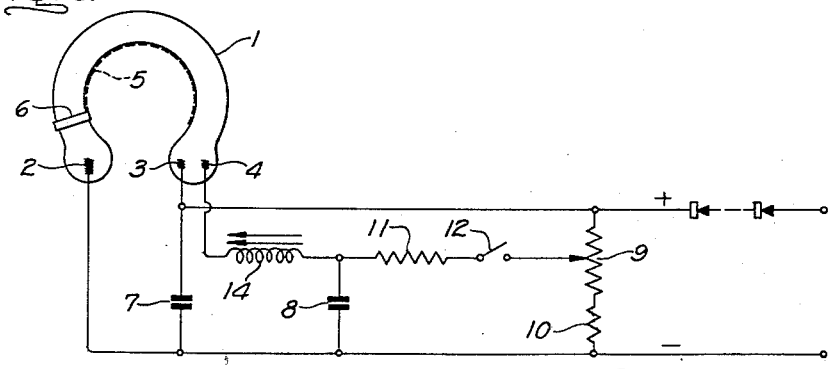

Fig. 3 diagrammatically illustrates a further embodiment of the invention.

Referring now to Fig. 1, a discharge flash tube 1 has a cathode 2, a main anode 3, and a secondary anode 4 and is provided, in the usual manner, with an igniting strip or coating 5 which may be connected to the starting voltage across a clip 6.

The main anode 3 is connected with a main electrolytic condenser 7, and the secondary anode 4 is connected with a secondary electrolytic condenser 8. The condensers 7 and 8 are therefore in parallel with the cathode 2 and their respective anodes 3, 4. The condensers are charged by a source of direct current or rectified alternating current. The secondary condenser 8 has relatively less capacity than the main condenser 7 and is capable of being charged to a variable voltage by means of the voltage divider or potentiometer 9 connected in parallel between the cathode 2 and main anode 3. A limiting resistance 10 is provided in series with and on the negative end of the voltage divider so that the negative pole of the voltage cannot be applied directly to the secondary anode as otherwise the anode would thereby act as a cathode. A protective resistance 11 between the variable tap of the voltage divider and the positive pole of the secondary condenser protects the potentiometer and limits the charging current of the secondary condenser. In order to permit the secondary condenser to come to zero potential a switch 12 is provided to permit disconnection from the voltage divider 9. The switch, may, for instance, be operated by the regulating mechanism of the voltage divider after the small voltage on the tap has been obtained; loading of the switch in this arrangement is small.

The energy applied to the flash tube across the main anode is, as already mentioned, always the same because the main anode is always connected with the same capacity condenser which lies on a constant potential. A device according to the modification given in Fig. 1 can, by way of example but not by way of limitation, have the main condenser 7 charged to a voltage of 500 volts, and which may be, for example, of a capacity of 500 microfarads. A secondary condenser, also, for example, of 500 microfarads capacity, may be capable of being charged from zero volts to 500 volts by means of the voltage divider 9 which may be, for example, 1 megohm. The limiting resistance 10 on the negative end of the voltage divider 9 may be, for example, 100 kilohms. The protective resistance 11 may be, for example, 500 ohms. Such a device showed that if the secondary condenser 8 was charged to a potential of about 200 volts, the same quantity of light was obtained as if the discharge tubes were of the single anode type only. At a lower voltage on the secondary condenser 8 energy is removed from the flash discharge; at higher voltages, energy is put into it. By this means light intensity can be varied continuously in a proportion of about 1:5 so that there may be obtained corresponding intermediate values for the guide numbers used in photography.

Fig. 2 shows an alternative arrangement in which a variable resistor 13 is connected between the positive pole of the voltage supply and the electrolytic condenser 8, instead of a voltage divider as illustrated in Fig. 1.

Fig. 3 illustrates another modification of an arrangement for influencing the temporary course of the discharge and of its duration, and wherein a variable inductance 14 is connected between the secondary condenser 8 and the secondary anode 4 to thereby vary the time constants of discharge of the main and secondary condensers and thereby vary the times at which voltages are impressed between the cathode and the main and secondary anodes respectively.

The arrangement according to the present invention has the important advantage that it makes possible a regulation of the intensity of the flash output continuously or in any desired step. Contrary to other kinds of arrangements, starting conditions for discharge of the lamp within the whole regulating range remain the same because the charging voltage of the main condenser is constant. The present invention has the further advantage of being inexpensive and providing a cheap solution to the problem.

What is claimed as new and desired to be secured by Letters Patent of the United States is:

1. An electronic flash producing system capable of producing flash discharges of variable intensity comprising, in combination, a discharge tube having a cathode, a starting electrode, a main anode and a secondary anode, a source of electrical energy of positive and negative potentials, said cathode being connected to the source of negative potential and said main anode being connected to the source of positive potential, a first condenser connected electrically in parallel with the cathode and main anode of said discharge tube and across said source of electrical energy, a second condenser connected electrically in parallel with the cathode and the secondary anode of said discharge tube, one side of said second condenser being also connected to the source of negative potential, a voltage divider comprising a resistor connected electrically across said source of electrical energy, said voltage divider having a variable voltage tap electrically connected to the other side of said second condenser and to said secondary anode, and a protective resistance connected electrically between said variable voltage tap and said other side of said second condenser.

2. An electronic flash producing system capable of producing flash discharges of variable intensity comprising, in combination, a discharge tube having a cathode, a starting electrode, a main anode and a secondary anode, a source of electrical energy of positive and negative potentials, said cathode being connected to the source of negative potential and said main anode being connected to the source of positive potential, a first condenser connected electrically in parallel with the cathode and main anode of said discharge tube and across said source of electrical energy, the second condenser connected electrically in parallel with the cathode and secondary anode of said discharge tube, one side of said second condenser being also connected to the source of negative potential, a voltage divider comprising a potentiometer having a variable voltage tap, one end of said potentiometer being connected to the source of positive potential, a resistor connecting the other end of said potentiometer to the source of negative potential, said variable voltage tap being electrically connected to the other side of said second condenser and to said secondary anode, and a protective resistance connected electrically between said variable voltage tap and said other side of said second condenser.

References Cited in the file of this patent

UNITED STATES PATENTS

| | | |
|---|---|---|
| 1,876,058 | Kayser | Sept. 6, 1932 |
| 2,201,166 | Germeshausen | May 21, 1940 |
| 2,393,316 | Edgerton | Jan. 22, 1946 |
| 2,478,908 | Edgerton | Aug. 16, 1949 |